(12) United States Patent
Davison

(10) Patent No.: US 6,539,017 B1
(45) Date of Patent: *Mar. 25, 2003

(54) METHOD AND APPARATUS FOR ARRANGING AND ADJUSTING A BUNDLE IN AN ATM NETWORK

(75) Inventor: Michael Davison, Aberdeen, WA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,746

(22) Filed: Jun. 28, 1999

(51) Int. Cl.⁷ .............................................. H04L 12/56
(52) U.S. Cl. .................... 370/395.21; 370/397; 370/409
(58) Field of Search ........................ 370/395.2, 395.21, 370/397, 409

(56) References Cited

U.S. PATENT DOCUMENTS

| | | | | |
|---|---|---|---|---|
| 5,953,338 A | * | 9/1999 | Ma et al. | 370/377 |
| 6,031,837 A | * | 2/2000 | Hirase | 370/395.2 |
| 6,097,722 A | * | 8/2000 | Graham et al. | 370/395.21 |
| 6,128,659 A | * | 10/2000 | Subblah et al. | 370/230 |
| 6,314,103 B1 | * | 11/2001 | Medhat et al. | 370/395.2 |
| 6,389,022 B1 | * | 5/2002 | Jeong et al. | 370/395.1 |
| 6,400,687 B1 | * | 6/2002 | Davison et al. | 370/230 |

OTHER PUBLICATIONS

Sikora, John and Ben Teitelbaum. "Differentiated Services for Internet2 (draft)", www.internet2.edu/qos/may98 Workshop/html/diffserv.html, May 1998: Santa Clara, CA;9pgs.

* cited by examiner

Primary Examiner—Hassan Kizou
Assistant Examiner—Dmitry Levitan
(74) Attorney, Agent, or Firm—Innovation Partners; Charles E. Golieb (57) ABSTRACT

A method and apparatus automatically creates and destroys a bundle of virtual circuits between two devices. Configuration information including a differentiated services profile is agreed upon by the two devices allowing configuration commands received at a single device to configure both devices. The method and apparatus can dynamically join virtual circuits to the bundle and remove them as needed, allowing the bundle to grow and contract according to traffic demands.

24 Claims, 4 Drawing Sheets

METHOD AND APPARATUS FOR ARRANGING AND ADJUSTING A BUNDLE IN AN ATM NETWORK

RELATED APPLICATIONS

The subject matter of this application is related to the subject matter of application Ser. No. 08/996,117, entitled, "METHOD AND APPARATUS FOR CONFIGURING NETWORK DEVICES" filed on Dec. 22, 1997 by Gabriel Lee and David Langley, having the same assignee as this application and is incorporated herein by reference in its entirety.

FIELD OF THE INVENTION

The present invention is related to computer networking software and more specifically to computer networking protocol software.

BACKGROUND OF THE INVENTION

Many communication networks communicate using a protocol. Some network protocols such as Asynchronous Transfer Mode (ATM) and other protocols logically arrange one or more physical communication paths between a pair of end points in the network into virtual circuits, referred to as VCs. Each VC supports one or more classes of service, referred to as CoS, to the network. Each CoS specifies the minimum performance of a virtual circuit that supports that CoS. A process or device that communicates with another device using a network selects a virtual circuit that supports the CoS that matches the needs of the process or device.

One way of selecting a virtual circuit is to determine the highest possible CoS the process or device might need and then always use a virtual circuit that supplies that CoS. While this method is suitable where needs of the device or process are relatively constant, if the device or process will have varying needs of the network, this method of selecting virtual circuits is inefficient because VCs with lower classes of service could be used.

For example, a host computer may communicate different forms of information and may do so with various devices. A different class of service may be required from the network depending on the type of information and the recipient of that information. For example, if the host is streaming data and related video to another host for storage, a virtual circuit with high capacity is required, but high delay is acceptable because storage of such information is not sensitive to delay. If the same information is being provided to the for display to a user, the same delay may be unacceptable for the video portion because such delay would cause the display to appear to jerk from image to image. However, a slightly larger amount of delay might be acceptable for the data portion. Nevertheless, the user's computer may not be able to accept the information with the same throughput as in the case where the information is being provided only for storage.

To optimize the usage of the network, a device may communicate using a bundle of virtual circuits instead of a single virtual circuit. A bundle is a logical association of multiple virtual circuits between the same two end points of an ATM or other type of network, such as between two routers. VCs are assigned to a bundle by each of the two routers or other end points. The sender of the information provides with the data a destination address and class of service identifier, which specifies the type of network service required by the information. The router receives the data, address, and class of service identifier, and selects from a bundle established between the router and a router serving the address a particular VC based on the class of service specified for the information and the classes of service offered by the VCs of the bundle. To map a class of service specified with a virtual circuit, the router may use a differentiated services. profile. The router then sends the information over the selected VC to the other router.

The bundling approach can be more efficient than using a single VC because information can be routed over a VC that provides a specific class of service rather than a VC with significantly higher class of service capability.

To arrange a bundle using conventional approaches, each router is configured individually. A network administrator assigns VCs to a bundle and then identifies the class or classes of service that each VC in the bundle may support. Such configuration is a time consuming process and subject to errors. Each bundle endpoint must be configured consistently, or the bundle may not work properly. In addition, the bundle must be configured for the worst-case scenario. That is, there must be sufficient capacity in the bundle to handle the expected worst case traffic. This configuration requires time-consuming traffic analysis that may turn out to be wrong. Furthermore, during the times the network traffic does not match the worst case scenario, network capacity is not efficiently used.

What is needed is a method and apparatus that can dynamically assign bidirectional VCs to bundles.

SUMMARY OF INVENTION

A method and apparatus accepts commands to build or destroy a bundle, and to add or remove VCs to a bundle. The method and apparatus communicates or negotiates with the remote device by sending messages to allow the bundle to be configured and to allow VCs to be dynamically added to and removed from the bundle. The method and apparatus on either end stores information about the bundle consistent with the commands it receives or sends to allow the conventional methods and apparatti to use the information about the bundles to route data being transmitted.

DETAILED DESCRIPTION OF A PREFERRED EMBODIMENT

Figure 1:
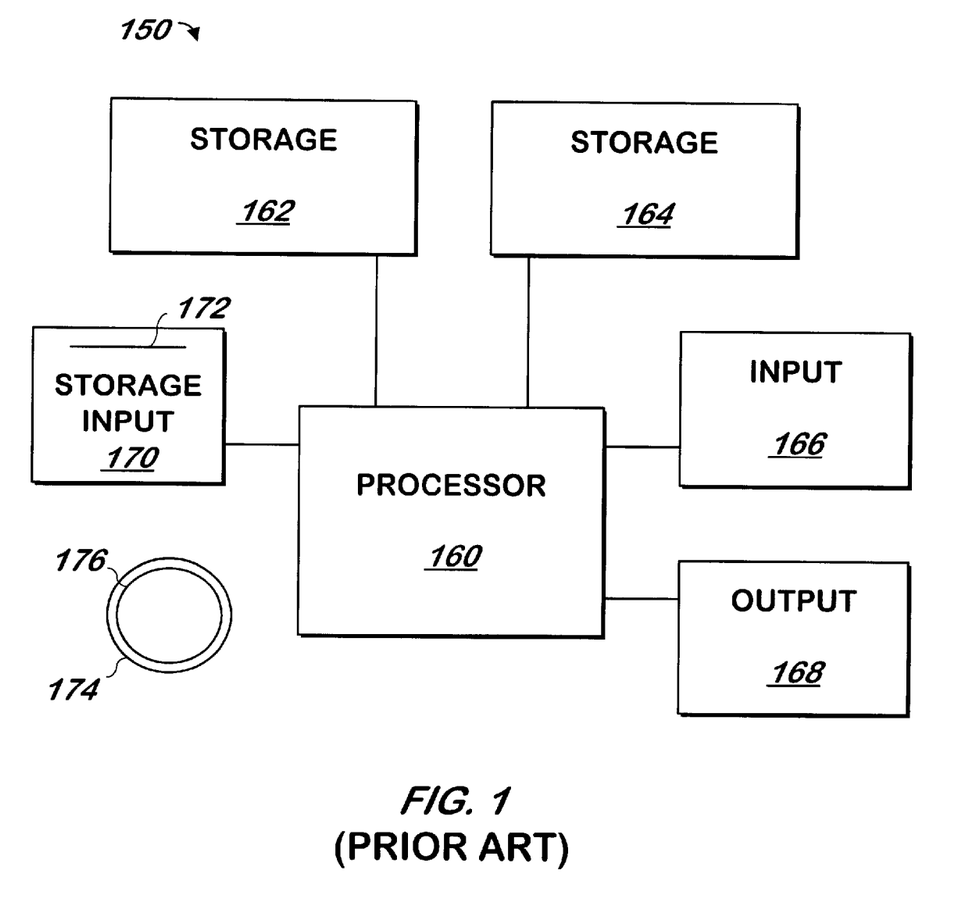
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 1 Creator computer running the Solarls 2.5.1 operating system commercially available-from Sun Microsystems of Mountain View, Calif., with suitable communication interfaces, although other systems such as conventional routers such as those commercially available from Cisco Systems, Inc. of San Jose, may be used.

Figure 2A:
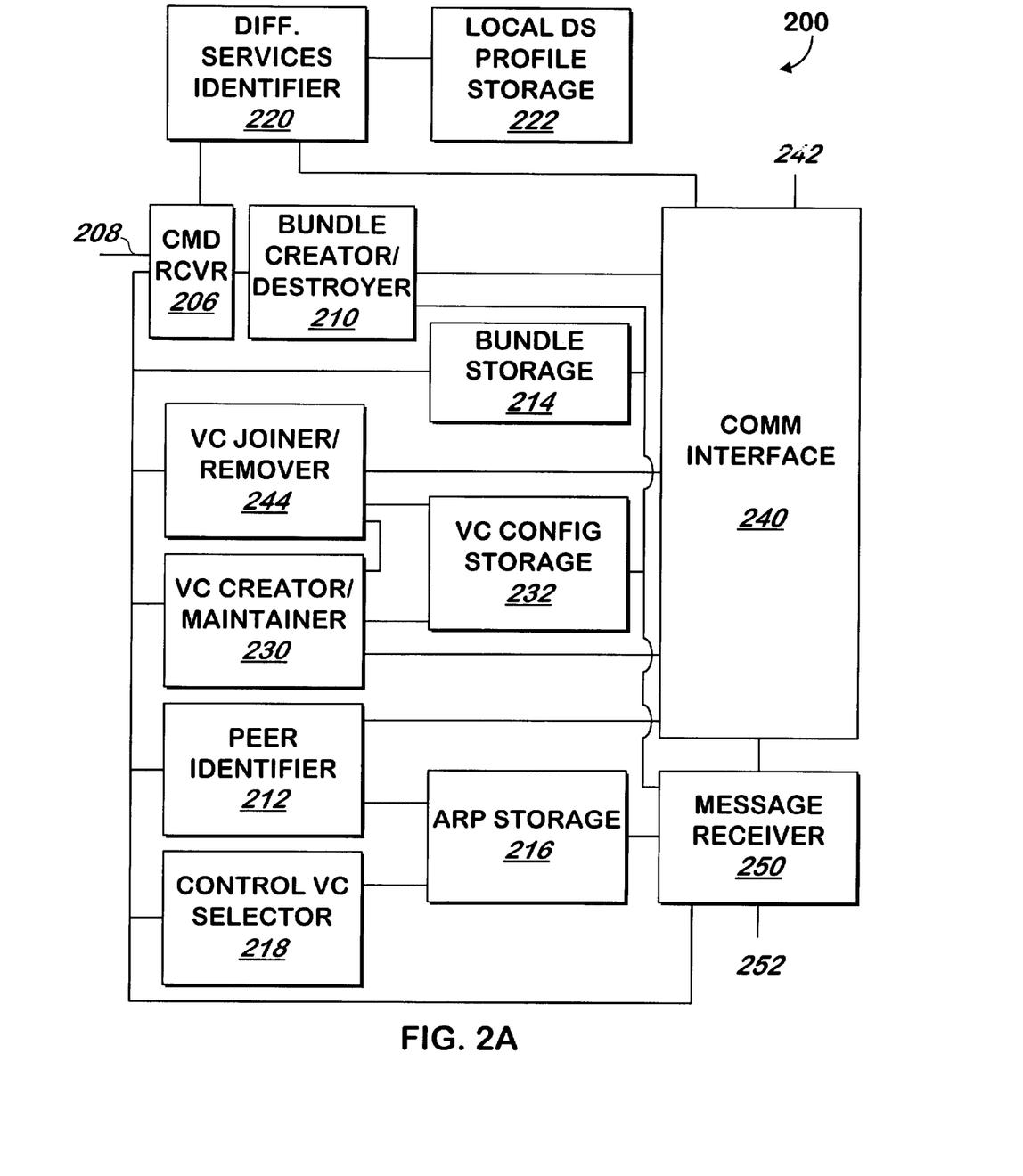
FIG. 2A is a block schematic diagram of an apparatus for automatically arranging, adjusting and destroying bundles according to one embodiment of the present invention.

Referring now to FIG. 2A, an apparatus 200 for automatically arranging, adjusting and destroying bundles is shown according to one embodiment of the present invention. As used herein, a "bundle" is a set of virtual circuits, each terminating at the same network device, such as a router, with at least two of the virtual circuits supporting different classes of service or similar specifications. A bundle is used by a router or other device to select one or more virtual circuits in the bundle based on the class of service or other specification of the virtual circuits in the bundle and the requirements of the information to be transmitted over the bundle. Although unidirectional VCs may be elements of a bundle, every bundle will have at least one bidirectional virtual circuit, which allows communication in two directions.

Command receiver 206 receives at input/output 208 a command to create or remove a bundle from the apparatus 200. If the command is to create a bundle, command receiver 206 signals peer identifier 212. Such command includes an address of the layer-3 device to which the bundle is to be arranged, and peer identifier 212 will identify a VC that can be used to reach the layer-3 device.

Peer identifier 212 identifies the IP or ATM address of layer-3 peers connected to the apparatus 200 using any of methods described below. Because the apparatus 200 may not be able to identify which VCs correspond to the address received in the create command, in one embodiment, peer identifier 212 identifies the addresses of all layer-3 peers of the device containing the apparatus 200. The apparatus 200 may then match the. VCs of the layer-3 devices connected to the device identified by peer identifier 212 to the device identified in the command.

In one embodiment for peers connected by permanent virtual circuits, peer identifier 212 may use the techniques described in the copending application listed above to identify the layer-3 address for each such peer.

In another embodiment, peer identifier 212 uses conventional Inverse Address Resolution Protocol. (InARP) messages to either retrieve the layer-3 addresses of each. device from an ARP table stored in ARP storage 216 or to request the layer-3 addresses by transmitting a request over each VC that is configured on the apparatus 200. In this embodiment, configuration information for each VC is stored in VC configuration storage 232, which may be conventional memory or disk storage. Peer identifier 212 scans VC configuration storage 232 to obtain the identifiers of each VC and uses the identifier of each VC to retrieve from the ARP table stored in ARP storage 216 the layer-3 address listed in the ARP table for that VC. Peer identifier 212 uses the conventional INverse Address. Resolution Protocol (INARP) to request IP addresses associated with the VCs that do not have layer-3 addresses in the ARP table in ARP storage. InARP is also known as Reverse Address Resolution Protocol, or RARP. Peer identifier 212 requests these addresses by transmitting the appropriate InARP message over each such VC via communication interface 240. Communication interface 240 is a conventional ATM communication interface which is coupled to one or more network communication circuits at input/output 242. Peer identifier 212 stores the resulting IP address received over each VC in ARP storage 216 and associates it with the VC from which it was received.

In another embodiment, peer identifier 212 uses connventional ATM Address Resolution Protocol (ATMARP) messages to either retrieve the layer-3 addresses of each device from the ARP table stored in ARP storage 216 or to request the layer-3 address by transmitting a request to an ATMARP server specified in VC configuration storage by transmitting the appropriate ATMARP message over communication interface 240. Peer identifier 212 stores the resulting ATM addresses with the corresponding layer-3 addresses in ARP storage 216 and creates an SVC to the ATM addresses learned via ATMARP.

Once peer identifier 212 has identified the layer-3 peers of the apparatus 200, peer identifier 212 signals command receiver 206. Command receiver 206 signals control VC selector 218 with the layer-3 address received in the command. Control VC Selector 218 selects one of the VCs that is associated with that layer-3 address in ARP storage 216 that is available for use as a bundle control and returns an identifier of the VC selected to command receiver 206.

In one embodiment, a VC may be a bundle control VC in only one bundle at a time and in other embodiments, a VC may be a bundle control for any of several bundles. If a VC may only be a bundle control for a single bundle, control VC selector 218 marks the VC as a control VC in ARP storage 216 and won't select VCs so marked as a bundle control VC.

If multiple VCs are associated in ARP storage with the layer-3 address specified in the command, control VC selector 218 can use any of several techniques to select the bundle control VC. Control VC selector 218 may select as the bundle control VC the first one located, or select it at random from among those associated with the layer-3 address in ARP storage 216. When a VC is selected as the bundle control, control VC selector 218 indicates in VC configuration storage 232 (via a connection not shown to avoid cluttering the Figure) that the VC is being used in a bundle.

Command receiver 206 signals differentiated services identifier 220 to identify the appropriate differentiated services profile. In one embodiment, information for selecting the appropriate differentiated services profile to use is stored in local differentiated services profile storage 222, which may be conventional memory or disk storage. In one embodiment, the address of each host, and the appropriate differentiated services profile to use for that host is stored in local differentiated services profile storage 222. When command receiver 206 signals differentiated services identifier 220, it includes the layer-3 address. Differentiated services identifier 220 returns the differentiated services profile associated with that address in local differentiated services profile storage 222. Other methods of determining the differentiated services profile to use may be employed. These include always using the same value or using rule-based determinations. Combinations of these techniques may also be employed. For example, if the address is in local differentiated services profile storage 222, differentiated services identifier 220 returns the profile associated with the address. Otherwise, if a rule can be determined, differentiated services identifier 220 uses the rule to determine the profile. Otherwise, a default profile is used.

Command receiver 206 provides to bundle creator/destroyer 210 the differentiated services profile it receives from differentiated services profile identifier 220 and the identifier of the VC it receives from control VC selector 218 and an identifier of the bundle-received with the command via input/output 208. The identifier of the bundle is an arbitrary number that will be used to identify the bundle in subsequent commands, and this number is received in the command in one embodiment, and in another embodiment, bundle creator/destroyer 210 assigns the bundle identifier and returns it to command receiver 206. Command receiver 206 can then return the bundle identifier via input/output 208 to the originator of the command it received in a confirmation message.

Bundle creator/destroyer 210 builds a create bundle message and uses communication interface 240 to send over the VC having the identifier received from command receiver the create bundle message it creates. In one embodiment, the bundle creation message has the format described in Exhibit A, although other formats may be used.

Bundle creator/destroyer 210 uses the negotiation techniques described below with reference to FIG. 3 to complete the bundle creation negotiation. Once the bundle creation is complete, bundle creator/destroyer 210 signals. command receiver 206, and stores the parameters agreed on in the negotiation in bundle storage 214. Bundle creator/destroyer 210 stores in bundle storage 214 other information such as the VC selected as the control VC. The parameters and other information are associated with the bundle identifier in bundle storage 214 by bundle creator/destroyer 210.

If the bundle creation is unsuccessful as described in more detail below, bundle creator/destroyer 210 signals, command receiver 206. Command receiver 206 signals control VC selector 218, which removes in VC configuration storage 232 the indication that the VC is in use by a bundle and the indication that the VC is a bundle control from ARP storage 216.

If the command received by command receiver 206 is a command to destroy a bundle, command receiver signals bundle creator/destroyer 210. In one embodiment, before destroying the bundle, command receiver performs the steps described below to remove all VCs, except the control VC, from the bundle. In another embodiment, the command to destroy a bundle must be preceded by one or more commands to remove all VCs except the control VC from the bundle. In such embodiment, bundle creator destroyer 210 checks bundle storage 214 to verify this requirement has been completed and if not, signals command receiver 206 which sends an error message via input/output 208.

Bundle creator/destroyer 210 retrieves from bundle storage 214 the identifier of the VC used as the control VC for that bundle, then builds and provides to communication interface 240 for transmission over the control VC a bundle destroy message, such as the bundle destroy message described in Exhibit A. Communication interface 240 provides the message over the specified VC via input/output 242. In one embodiment, the format of the bundle destroy message is the format set forth in Exhibit A, although other message types may be used to destroy a bundle. Bundle creator/destroyer 210 signals command receiver 206.

Command receiver 206 signals VC joiner/remover 244, which removes in VC configuration storage 232 the indication that the bundle control VC is in use in a bundle. VC joiner/remover 244 signals command receiver 206.

Command receiver 206 then signals control VC selector 218. Control VC selector 218 retrieves from bundle storage 214 the identifier of the VC used as the control VC and removes in ARP storage 216 the indication from the VC selected as the bundle control. Control VC Selector 218 signals command receiver 218, which signals bundle creator/destroyer 210. Bundle creator/destroyer 210 removes the bundle parameters from bundle storage 214.

Between the time a bundle is created and a bundle is destroyed, command receiver 206 may receive commands to join or remove one or more VCs from the bundle. In a dynamic SVC configuration environment, the command may specify that the VC is to be created before it is joined, or the command may specify that the VC is to be destroyed after it is removed. In such embodiment command receiver 206 signals VC creator/maintainer 230.

If the command specifies the VC is to be created, the command includes the appropriate VC creation parameters and command receiver also sends the parameters to VC creator/maintainer 230. VC creator/maintainer 230 sets up the VC according to the parameters it receives and makes the appropriate entries in VC configuration sto rage 232 using conventional VC creation techniques. VC creator/maintainer 230 provides to command receiver 206 an identifier of the VC and command receiver 206 provides this identifier via input/output 208 for future reference.

Command receiver 206 signals VC joiner/remover 244 with the identifier of the VC to be added or removed from the bundle and an identifier of the bundle that is received in the command. In a dynamic configuration environment, if the command is a join command, command receiver 206 may receive the identifier of the VC from VC creator/maintainer 230 or via input/output 208. Otherwise, the identifier of the VC is received at input/output 208 with the join or remove command.

VC joiner/remover 244 builds a join or remove message using the VC identifier and an indication of whether the command received was adjoin or remove, both received from command receiver 206. The message may have the format described in Exhibit A or be another form of message. VC joiner/remover retrieves from bundle storage 214 the control VC corresponding to the bundle identifier it receives, builds a join or remove message and provides it to communication interface 240 for transmission over the control VC. Communication interface 240 sends the message via input/output 242 to the layer-3 peer that terminates the control VC. VC joiner/remover also marks the VC in VC configuration storage 232 as in use or not in use depending on the indication of the command.

In a dynamic configuration SVC envirohment, if the command received by command receiver 206 was a remove command, and the command indicates the VC is to be destroyed, command receiver 206 also signals VC creator/maintainer 230, and sends an identifier of the VC to be removed. VC creator/maintainer 230 builds and sends a conventional VC destroy message to communication interface 240, which sends it via input/output 242.

Figure 2B:
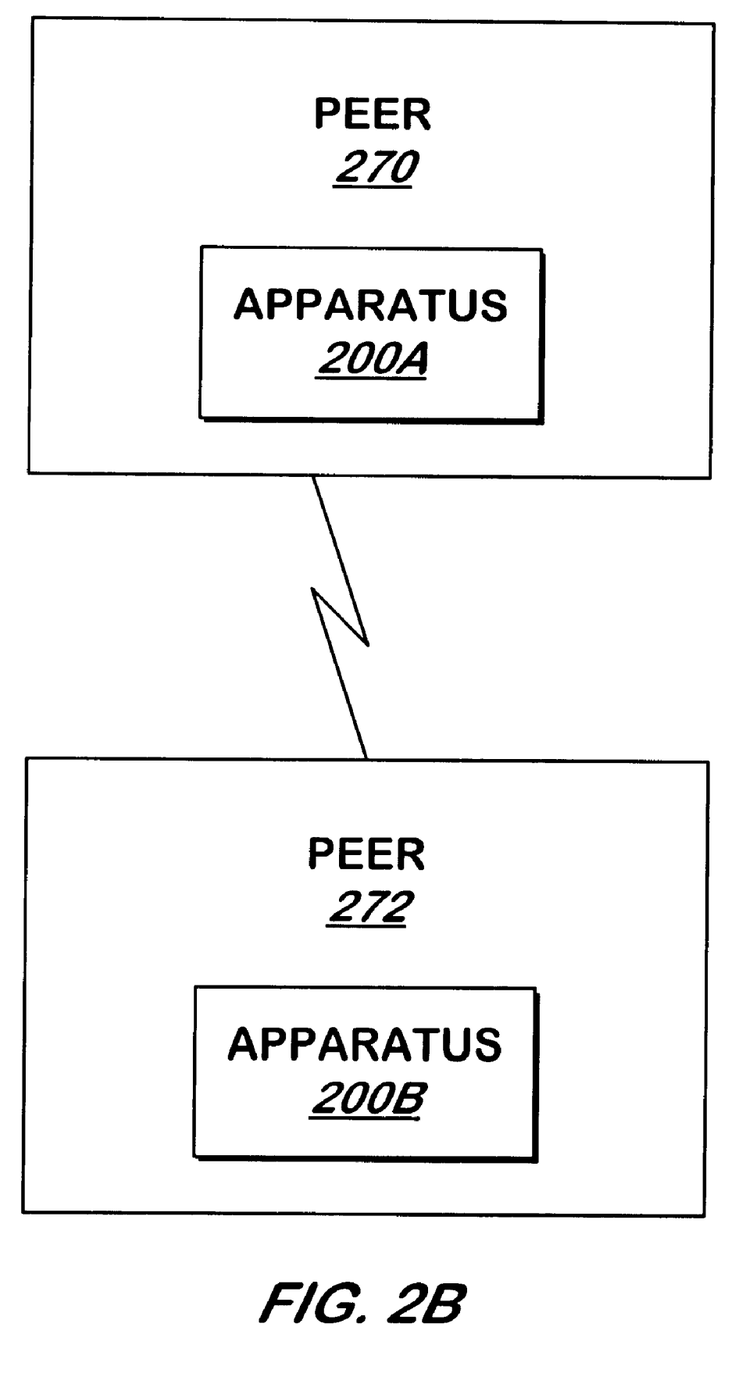
FIG. 2B is a flowchart illustrating two layer-3 peer devices in communication, with each device containing the apparatus illustrated in FIG. 2A according to one embodiment of the present invention.

The device on the other end of the bundle control VC maintains information about each bundle and optionally, each VC in each bundle, consistent with that maintained by the apparatus 200. Referring momentarily to FIG. 2B, in one embodiment, an apparatus 200B at a layer-3 peer 272 of the layer-3 device 270 that contains the apparatus 200A tracks the changes made by the apparatus 200A, which is described above as apparatus 200. The apparati 270, 272 are coupled in communication by one or more communications channels, such as that found in a conventional ATM or other network. The apparatus 200B at the layer-3 peer 272 performs the functions described below. In one embodiment, the apparatus 200A and the apparatus 200B at the layer-3 peer 270 perform all of the functions described above and all of the functions described below, depending on whether they are transmitting messages or receiving messages. As described herein, the apparatus 200A is capable of transmitting and receiving messages. However, in other embodiments, the apparatus 200A only receives and so it only performs the functions below; or the apparatus 200A only transmits and so it only performs the functions above.

Referring again to FIG. 2A, if the apparatus 200 receives an ARP/INARP/ATMARP request, communications interface 240 provides the request to peer identifier 212 which responds to the request via communications interface 240 and input/output 242 using conventional ARP/INARP/ATMARP protocols and techniques.

When the apparatus 200 receives a create bundle message such as that described in Exhibit A, communication interface 240 routes the message to message receiver 250. In one embodiment, communications interface routes all communications to message receiver 250, which listens to the communication and determines whether such communication is a message. If not, message receiver 250 passes it on via input/output 252 coupled to the remainder of a conventional router.

If the message received by message receiver 250 is a create bundle message, message receiver 250 passes it to bundle creator/destroyer 210, which accepts, rejects or negotiates the bundle creation as described herein via communications interface 240 and input/output 240. If the bundle is accepted, bundle creator/destroyer 210 places the parameters received in the message in bundle storage 214. Bundle creator/destroyer 210 signals VC joiner/remover 244 with the identifier of the VC over which the message was received, and VC joiner/remover 244 marks the VC as in use in a bundle in VC configuration storage 232. Bundle creator/destroyer 210 marks the VC as a bundle control VC in ARP storage 216. Additionally, bundle creator/destroyer inserts into bundle storage 214 the VC identifier of the bundle control and the parameters received as part of the message and described below in Exhibit A to set up the bundle.

If the message is a destroy bundle message, message receiver 250 passes the message to bundle creator/destroyer, which tears down the bundle as described above, and removes the bundle control VC and may remove any other VCs from the bundle as described above.

If the message is a join or remove message as described herein, message receiver 250 signals VC joiner/remover 244, which marks the VC as available or not available and adjusts the bundle storage 214 accordingly as described above. In a dynamic configuration VC environment, message receiver 250 may also signal VC creator/maintainer 230 to delete or create the VC as described above.

Whether the apparatus 200 can transmit or accept messages, the bundle parameters in bundle storage 214 are available for reading and writing at input/output 252 via message receiver 250 in addition to the information about each VC stored in VC configuration storage 232 and the ARP information stored in ARP storage 216. The router or other layer-3 device that houses the apparatus 200 will use the differentiated services profile in bundle storage 214 and the VCs associated with the bundle to route communications over the VCs that are part of the bundle using conventional bundling routing techniques.

Figure 3:
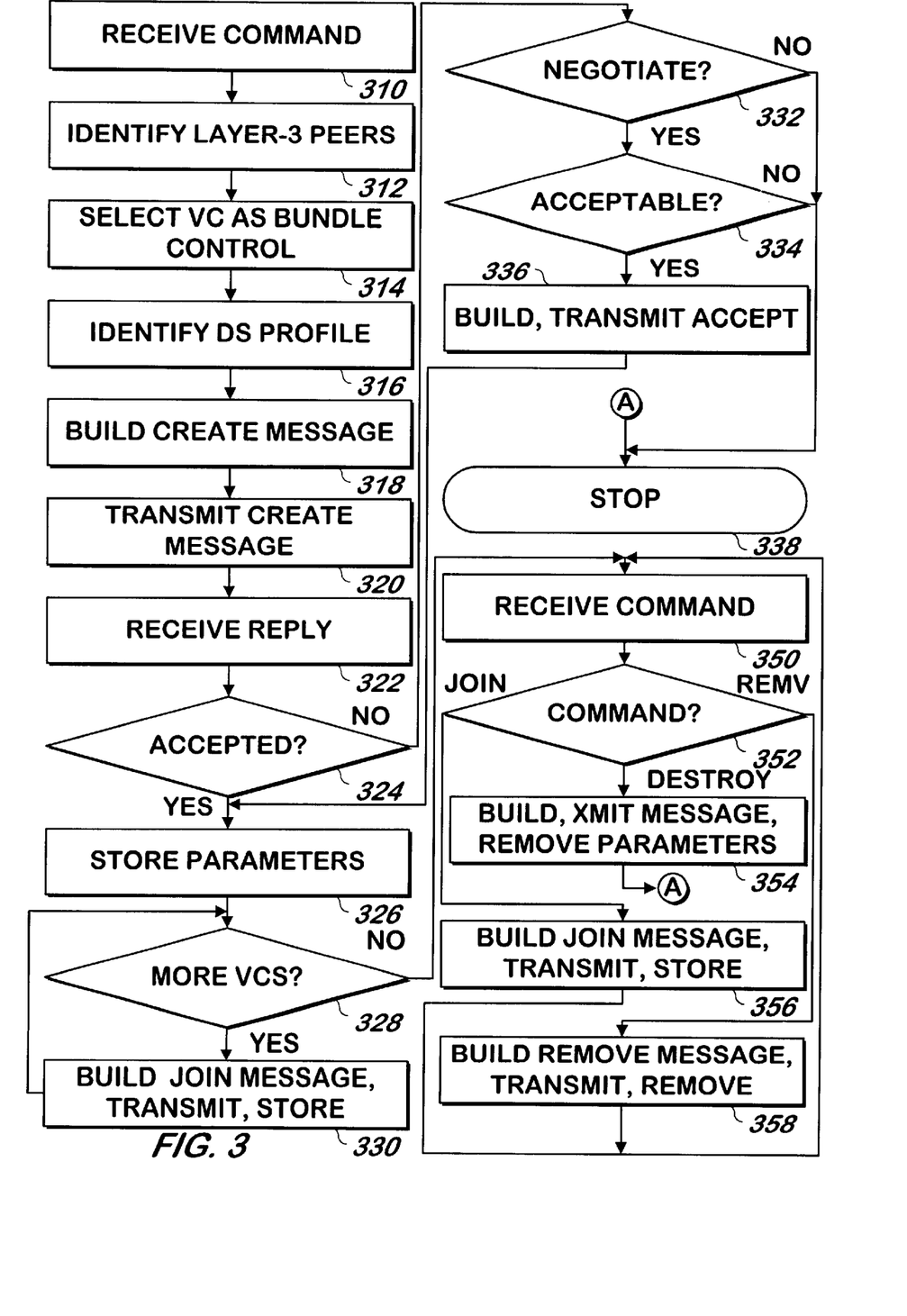
FIG. 3 is a flowchart illustrating a method of creating, adjusting and destroying a bundle according to one embodiment of the present invention.

Referring now to FIG. 3 a method of creating, adjusting and destroying a bundle is shown according to one embodiment of the present invention. A command to create a bundle to a layer-3 peer is received 310 as described above. In one embodiment, the command contains a layer-3 address of the peer, and may contain a description of the VCs to add to the bundle.

Layer-3 peers are identified 312 as described above. A VC to the layer-3 peer identified in the command received in step 310 is selected 314 as the bundle control as described above. Step 314 may include creating the VC in a dynamic configuration SVC environment as described above. Step 314 may also include marking the VC as the bundle control and as in use by a bundle as described above. A differentiated services profile is identified 316 as described above.

A create bundle message, such as the message set forth in Exhibit A, is built 318 and transmitted 320 over the VC selected in step 314. A reply to the message is received 322. If the create bundle message is accepted 324, the method continues at step 326. Otherwise, the bundle creation is negotiated or rejected.

If the reply does not indicate that the layer-3 peer wishes to negotiate, or the bundle creation message transmitted in step 320 does not indicate that negotiation is available 332, the method terminates.338. Otherwise, if the creation message transmitted in step 320 indicates that negotiation is available 332 and the reply indicates that it contains a proposal for negotiated bundle parameters. 332, if the negotiated bundle parameters are acceptable 334, a bundle creation message is built and transmitted 336 accepting the proposed parameters and the method continues at step 326. Otherwise, the method terminates 338.

At step 326, the bundle parameters proposed or otherwise agreed upon, including the differentiated services profile are stored, and the method continues at step 328.

If no additional VCs are needed to complete the bundle as specified in the command received in step 310, the method continues at step 350. If additional VCs are needed to create the bundle 328 as specified in the command received in step 310, the additional VCs are optionally created and are joined 330 to the bundle as described in step 356 below. The VC is marked as belonging to the bundle in one embodiment as part of step 330 and step 356 described below. The method continues at step 328 until all VCs specified in the command received are joined in step 330, and the method continues at step 350.

In one embodiment, the device that transmitted the original create message is responsible for joining the additional VCs in steps 324 and 326,and in another embodiment, the device that originated the create message that was ultimately accepted is responsible for creating and joining any VCs.

At step 350, an additional command is received. If the command is a bundle destroy command 352, a destroy bundle message is built according to the command as described above, and transmitted 354 over the bundle control VC for the bundle specified in the command selected in step 314. The parameters are removed and VCs disassociated 354 with the bundle specified in the command and associations with the destroyed bundle are removed as described above. In one embodiment, the command received in step 350 may specify that all VCs associated with the bundle are to be torn down as well, and step 354 includes tearing down the VCs associated with the bundle, for example by tearing them down before the parameters are removed as described above. The method then terminates at step 338.

If the command received in step 350 is a remove command 352, a remove VC message such as the one described in Exhibit A is built according to the command as described above and transmitted 358 over the bundle control VC selected in step 314. In one embodiment, the command may specify that the VC is to be torn down and step 358 includes building and transmitting a message to tear down the VC using conventional dynamic VC configuration techniques. The method continues at step 350.

If the command received in step 350 is a join command 352, a join message is built and transmitted over the VC selected in step 314 as the bundle control for the bundle specified in the command as described above. The VC is associated with the bundle in step 356. In one embodiment, the command may specify that the VC is to be created and step 356 includes creating the VC using conventional dynamic VC configuration techniques.

Concurrently with steps 328–358, a conventional routing process routes information over the bundle using the parameters stored in step 326 using conventional bundle routing techniques.

Exhibit A

Create, Destroy, Join, Leave Message

Each message contains a header and as many VC tuple common parts as needed. A VC Tuple IP specific part is for each VC Tuple common part if the VC supports IP.

| Octet | Name | Explanation |
|---|---|---|
| | Header | |
| 0 | Version | Contains version number, starting with 0. If the recipient of a message does not support the version, the recipient is to drop the message. |
| 1 | Operation | 1 = create, 2=destroy, 3= Join, 4= leave. Messages containing other values are to be dropped by the recipient. |
| 2 | Bundle ID | An arbitrary value assigned by the creator of the bundle. Used to identify subsequent bundle messages as pertaining to the bundle having the same Bundle ID. |
| 3 | Rank | Used only for create requests. Can be used for any purpose by the creator. |
| 4 | Flags | The bits are NRRuuuuu. If N = 1 in a create message, the recipient of the message is allowed to negotiate the request, if 0, no negotiation is allowed: if the recipient cannot accept the create message, the recipient must reject it. RR describes the type of |

-continued

| Octet | Name | Explanation |
|---|---|---|
| | | create message: 00 is a request, 01 is a create message that is a reply, signifying the create message has been accepted. 10 is a reply message indicating the create message has been rejected. 11 is a reply message indicating the reply is rejected, but offering an alternate create message in substitution. u is unused. |
| 5–6 | Checksum | A checksum calculated according to conventional IP checksum techniques, with the checksum initialized to 0. If the checksum is 0, it indicates the checksum is unused. |
| 7 | Reserved | Reserved for future use. |
| | VC Tuple Common Part | |
| 1 | VC ID | An arbitrary value assigned by the VC creator. Used to identify a VC in subsequent messages. |
| 2 | Reserved | Reserved for future use. |
| 3–4 | Protocol | Indicates the layer −3 protocol for the tuple. |
| | VC Tuple - IP Specific Part | |
| 5 | DS Value | The DS value associated with this VC |
| 6–8 | Reserved | Reserved for future use |

What is claimed is:

1. A method of arranging a bundle, the method comprising:
   receiving a command to arrange the bundle, wherein the bundle comprises a plurality of virtual circuits;
   transmitting to a device at least one message to arrange the bundle responsive to the command received, wherein the at least one message comprises a first set of one or more parameters that indicate how the bundle is to be arranged; and
   receiving, in response to the at least one message, another message that comprises a second set of one or more parameters that indicate how the bundle is to be arranged, wherein the second set differs from the first set.

2. The method of claim 1 additionally comprising the step of identifying a differentiated services profile for the bundle.

3. The method of claim 2 additionally comprising the step of storing the differentiated services profile identified.

4. The method of claim 1 additionally comprising the steps of:
   receiving a command to destroy the bundle; and
   transmitting to the device a message to destroy the bundle.

5. The method of claim 1 comprising the additional step of transmitting to the device a message to include at least one virtual circuit into the bundle responsive to at least one command.

6. The method of claim 1 comprising the additional step of transmitting to the device a message to remove at least one virtual circuit from the bundle responsive to at least one command.

7. The method of claim 1:
   comprising the additional step of identifying at least one layer-3 peer; and
   wherein the message transmitted is responsive to the identifying step.

8. A computer program product comprising a computer useable medium having computer readable program code embodied therein for arranging a bundle, the computer program product comprising:

computer readable program code devices configured to cause a computer to receive a command to arrange the bundle, wherein the bundle comprises a plurality of virtual circuits;

computer readable program code devices configured to cause a computer to transmit to a device at least one message to arrange the bundle responsive to the command received, wherein the at least one message comprises a first set of one or more parameters that indicate how the bundle is to be arranged; and computer readable program code devices configured to cause a computer to receive, in response to the at least one message, another message that comprises a second set of one or more parameters that indicate how the bundle is to be arranged, wherein the second set differs from the first set.

9. The computer program product of claim 8 additionally comprising computer readable program code devices configured to cause a computer to identify a differentiated services profile for the bundle.

10. The computer program product of claim 9 additionally comprising computer readable program code devices configured to cause a computer to store the differentiated services profile identified.

11. The computer program product of claim 8 additionally comprising:

computer readable program code devices configured to cause a computer to receive a command to destroy the bundle; and computer readable program code devices configured to cause a computer to transmit to the device a message to destroy the bundle.

12. The computer program product of claim 8 additionally comprising computer readable program code devices configured to cause a computer to transmit to the device a message to include at least one virtual circuit into the bundle responsive to at least one command.

13. The computer program product of claim 8 additionally comprising computer readable program code devices configured to cause a computer to transmit to the device a message to remove at least one virtual circuit from the bundle responsive to at least one command.

14. The computer program product of claim 8:

additionally comprising computer readable program code devices configured to cause a computer to identify at least one layer-3 peer; and wherein the message transmitted is responsive to the computer readable program code devices configured to cause a computer to identify.

15. An apparatus for arranging a bundle, the apparatus comprising:

a command receiver for receiving at an input a command to arrange the bundle, wherein the bundle comprises a plurality of virtual circuits, the command receiver for signaling at an output responsive to the command received; and a bundle creator/destroyer having an input coupled to the command receiver output, for transmitting to an output operatively coupled for communication with a remote device at least one message to arrange the bundle responsive to the command received at the input, wherein the at least one message comprises a first set of one or more parameters that indicate how the bundle is to be arranged;

wherein the bundle creator/destroyer is for receiving, in response to the at least one message, another message that comprises a second set of one or more parameters that indicate how the bundle is to be arranged, wherein the second set differs from the first set.

16. The apparatus of claim 15:

wherein the bundle creator/destroyer additionally has a differentiated services profile input/output and the bundle creator/destroyer is additionally for providing at the bundle creator/destroyer differentiated services profile input/output a request for a differentiated services profile responsive to the signal received at the bundle creator/destroyer input;

the apparatus additionally comprises a differentiated services profile identifier having an input/output coupled to the command receiver signal output for receiving the request and providing at the differentiated services profile identifier input/output the differentiated service profile responsive to the request; and wherein the bundle creator destroyer is additionally for receiving the differentiated services profile at the bundle creator/destroyer differentiated services profile input/output and building the message responsive to said differentiated services profile.

17. The apparatus of claim 16:

wherein the bundle creator/destroyer is additionally for providing at a storage input/output the differentiated services profile; and the apparatus additionally comprises a bundle storage for storing the differentiated services profile received at an input/output coupled to the bundle creator/destroyer storage input/output.

18. The apparatus of claim 15:

wherein the command receiver is additionally for receiving a command to join at least one virtual circuit to the bundle and for providing at a join/remove output an indication to join a virtual circuit to the bundle responsive to at least one command; and the apparatus additionally comprises a VC joiner/remover having an input coupled to the command receiver join/remove output for receiving the indication, and for transmitting at an output operatively coupled for communicating with the device a message to join the at least one virtual circuit responsive to the indication.

19. The apparatus of claim 15:

wherein the command receiver is additionally for receiving a command to remove at least one virtual circuit to the bundle and for providing at a join/remove output an indication to remove a virtual circuit to the bundle responsive to at least one command; and the apparatus additionally comprises a VC joiner/remover having an input coupled to the command receiver join/remove output for receiving the indication, and for transmitting at an output operatively coupled for communicating with the device a message to remove the at least one virtual circuit responsive to the indication.

20. The apparatus of claim 15:

wherein the command receiver is additionally for providing a peer signal at a peer identifier input/output responsive to the command received;

the apparatus additionally comprising a peer identifier having an input/output coupled to receive the peer signal, for transmitting at a peer identifier input/output coupled for communication with a plurality of layer-3 peer devices including the device a request for identifiers and for receiving a plurality of said identifiers; and wherein the message is responsive to at least one of said plurality of identifiers.

21. An apparatus for arranging a bundle, the apparatus comprising:

means for receiving a command to arrange the bundle, wherein the bundle comprises a plurality of virtual circuits;

means for transmitting to a device at least one message to arrange the bundle responsive to the command received, wherein the at least one message comprises a first set of one or more parameters that indicate how the bundle is to be arranged; and means for receiving, in response to the at least one message, another message that comprises a second set of one or more parameters that indicate how the bundle is to be arranged, wherein the second set differs from the first set.

22. The method of claim 1, wherein:

the at least one message that comprises the first set indicates whether the first set of parameters may be negotiated; and the message that comprises the second set is responsive to an indication that the first set of parameters may be negotiated.

23. The method of claim 1, wherein the first set comprises one or more tuples, wherein at least one tuple of the one or more tuples indicates a virtual circuit and an associated layer-3 protocol.

24. The method of claim 23, wherein the at least one tuple indicates at least one parameter that is Internet Protocol (IP) specific if the associated layer-3 protocol is EP.

* * * * *

UNITED STATES PATENT AND TRADEMARK OFFICE
CERTIFICATE OF CORRECTION

PATENT NO. : 6,539,017 B1
DATED : March 25, 2003
INVENTOR(S) : Michael Davison

It is certified that error appears in the above-identified patent and that said Letters Patent is hereby corrected as shown below:

<u>Column 14,</u>
Line 14, replace "EP" with -- IP --.

Signed and Sealed this

Twenty-ninth Day of July, 2003

JAMES E. ROGAN
*Director of the United States Patent and Trademark Office*